United States Patent
Zhu (10) Patent No.: US 10,650,486 B2
(45) Date of Patent: May 12, 2020

(54) PREVIEWING DYNAMIC IMAGES AND EXPRESSIONS

(71) Applicant: Alibaba Group Holding Limited, George Town (KY)

(72) Inventor: Zhiqiang Zhu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/842,395

(22) Filed: Dec. 14, 2017

(65) Prior Publication Data

US 2018/0108111 A1 Apr. 19, 2018

Related U.S. Application Data

(63) Continuation of application No. PCT/CN2016/085400, filed on Jun. 12, 2016.

(30) Foreign Application Priority Data

Jun. 19, 2015 (CN) .......................... 2015 1 0346514

(51) Int. Cl.
*G06F 3/0484* (2013.01)
*G06T 1/60* (2006.01)
(Continued)

(52) U.S. Cl.
CPC .............. *G06T 1/60* (2013.01); *G06F 3/0484* (2013.01); *G06F 9/44* (2013.01); *G06K 9/52* (2013.01); *G06T 3/40* (2013.01)

(58) Field of Classification Search
None
See application file for complete search history.

(56) References Cited

U.S. PATENT DOCUMENTS 7,877,750 B2 * 1/2011 Agiwal ................. G06F 9/4843
709/201
9,818,451 B1 * 11/2017 Tyagi ..................... G11B 27/34
(Continued)

FOREIGN PATENT DOCUMENTS

CN 102568021 7/2012
CN 102637421 8/2012
(Continued)

OTHER PUBLICATIONS

International Search Report by the International Searching Authority issued in International Application No. PCT/CN2016/085400 dated Sep. 1, 2016; 9 pages.
(Continued)

*Primary Examiner* — David H Chu
(74) *Attorney, Agent, or Firm* — Fish & Richardson P.C.

(57) ABSTRACT

A location of a preview image of a dynamic image is determined not to be stored in memory. A request for a frame number of at least one static image included in the dynamic image to an acquired network address is transmitted in response to determining the preview image is not stored in the memory. An issued frame number from the network address is received and the issued frame number is set as a designated frame number for the at least one static image. The at least one static image is extracted having the set designated frame number. The at least one static image is displayed having the set designated frame number as the preview image to a user.

20 Claims, 6 Drawing Sheets

(51) Int. Cl.
G06F 9/44 (2018.01)
G06K 9/52 (2006.01)
G06T 3/40 (2006.01)

(56) References Cited

U.S. PATENT DOCUMENTS

| | | | | |
|---|---|---|---|---|
| 2007/0030510 | A1* | 2/2007 | Horiuchi | H04N 1/00209 |
| | | | | 358/1.15 |
| 2007/0097205 | A1* | 5/2007 | Venkatachalam | H04N 21/234327 |
| | | | | 348/14.02 |
| 2008/0039124 | A1* | 2/2008 | Linder | H04M 1/72544 |
| | | | | 455/466 |
| 2009/0110363 | A1* | 4/2009 | Kim | G11B 27/105 |
| | | | | 386/241 |
| 2010/0284670 | A1* | 11/2010 | Li | G06K 9/00751 |
| | | | | 386/278 |
| 2012/0020648 | A1* | 1/2012 | Yamaji | G11B 27/034 |
| | | | | 386/278 |
| 2013/0236119 | A1* | 9/2013 | Campbell | G06T 11/60 |
| | | | | 382/284 |
| 2014/0365892 | A1* | 12/2014 | Jiang | G06F 3/04842 |
| | | | | 715/719 |
| 2015/0062376 | A1* | 3/2015 | Ohnishi | G06F 16/54 |
| | | | | 348/231.2 |
| 2015/0314454 | A1* | 11/2015 | Breazeal | B25J 9/0003 |
| | | | | 700/259 |
| 2016/0104513 | A1* | 4/2016 | Bloch | G11B 27/34 |
| | | | | 715/720 |
| 2016/0274999 | A1* | 9/2016 | Florez-Larrahondo | H04L 67/10 |
| 2016/0277333 | A1* | 9/2016 | Yuan | H04L 51/04 |
| 2016/0283049 | A1* | 9/2016 | Faydi | G06F 3/04883 |
| 2017/0052946 | A1* | 2/2017 | Gu | G06F 17/279 |
| 2018/0054404 | A1* | 2/2018 | Ye | H04M 1/72547 |

FOREIGN PATENT DOCUMENTS

| | | |
|---|---|---|
| CN | 102842142 | 12/2012 |
| CN | 103853417 | 6/2014 |
| CN | 103856507 | 6/2014 |
| CN | 103986933 | 8/2014 |
| WO | 2014171142 | 10/2014 |

OTHER PUBLICATIONS

European Extended Search Report in European Application No. 16810956.9, dated Jan. 25, 2019, 10 pages.
Search Report and Written Opinion of the Intellectual Property Office of Singapore issued in Singapore Application No. 11201710357S dated Jul. 31, 2018; 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/085400, dated Dec. 19, 2017, 10 pages. (with English translation).

* cited by examiner

PREVIEWING DYNAMIC IMAGES AND EXPRESSIONS

This application is a continuation of PCT Application No. PCT/CN2016/085400, filed on Jun. 12, 2016, which claims priority to Chinese Patent Application No. 201510346514.7, filed on Jun. 19, 2015, and each application is incorporated by reference in its entirety.

BACKGROUND

As the interne continues to develop, online social interactions will become an indispensable part of people's daily life. In some implementations, social software can provide a variety of input expression functions. These input expression functions assist users with vividly and accurately expressing emotional intent through social software, such as instant messaging. As such, these expressions become a core component of the social software.

In some implementations, a user of a social software can utilize both dynamic expressions and static expressions to express emotional intent. For instance, in social software, a user can first preview multiple dynamic expressions in an expression package. The user can then select a to-be-used dynamic expression from a preview page. In some implementations, each dynamic expression in an expression package installation file includes two files. The first file includes a dynamic image and the second file includes a preview image. A user can use the two files to preview and utilize the dynamic expression, respectively. In order to accomplish the use of the whole dynamic expression, the dynamic image and the preview image are required. However, during the time when a user downloads an expression package, higher network traffic might ensue when the expression package installation is of a large size and the workload is high.

SUMMARY

The present disclosure describes previewing a dynamic image that includes several frames of static image data.

In an implementation, a location of a preview image of a dynamic image is determined not to be stored in memory. A request for a frame number of at least one static image included in the dynamic image to an acquired network address is transmitted in response to determining the preview image is not stored in the memory. An issued frame number from the network address is received and the issued frame number is set as a designated frame number for the at least one static image. The at least one static image is extracted having the set designated frame number. The at least one static image is displayed having the set designated frame number as the preview image to a user.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the system can reduce the processing time to generate a preview image and improve the efficiency of previewing the dynamic image. Second, pre-configuring a corresponding built-in frame number into the client device creates an efficiency improvement for previewing a dynamic image and reduces network traffic.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes previewing a dynamic image that includes several frames of static image data, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In some implementations, a computer device can form a dynamic image by combining a plurality of static images, each of the static images including varying content. The dynamic image includes image data from each of the static images. For instance, the image data from each static image includes a frame of image data. By combining the static images and displaying the static images in a continuous manner frame-by-frame, a dynamic image effect is created. For example, combining static images of a person running and displaying the static images frame-by-frame illustrates the dynamic effect of the user running.

In some implementations, a preview image of the dynamic image can be provided utilizing one of the static images incorporated from the dynamic image. For instance, a second image from the set of static images can be utilized to display a preview image to a user. In addition, the image data used for a preview image from dynamic image data of a preview image of a dynamic expression in an expression package is repeated information, and the size of an installation file may be reduced by removing the repeated information.

Figure 1:
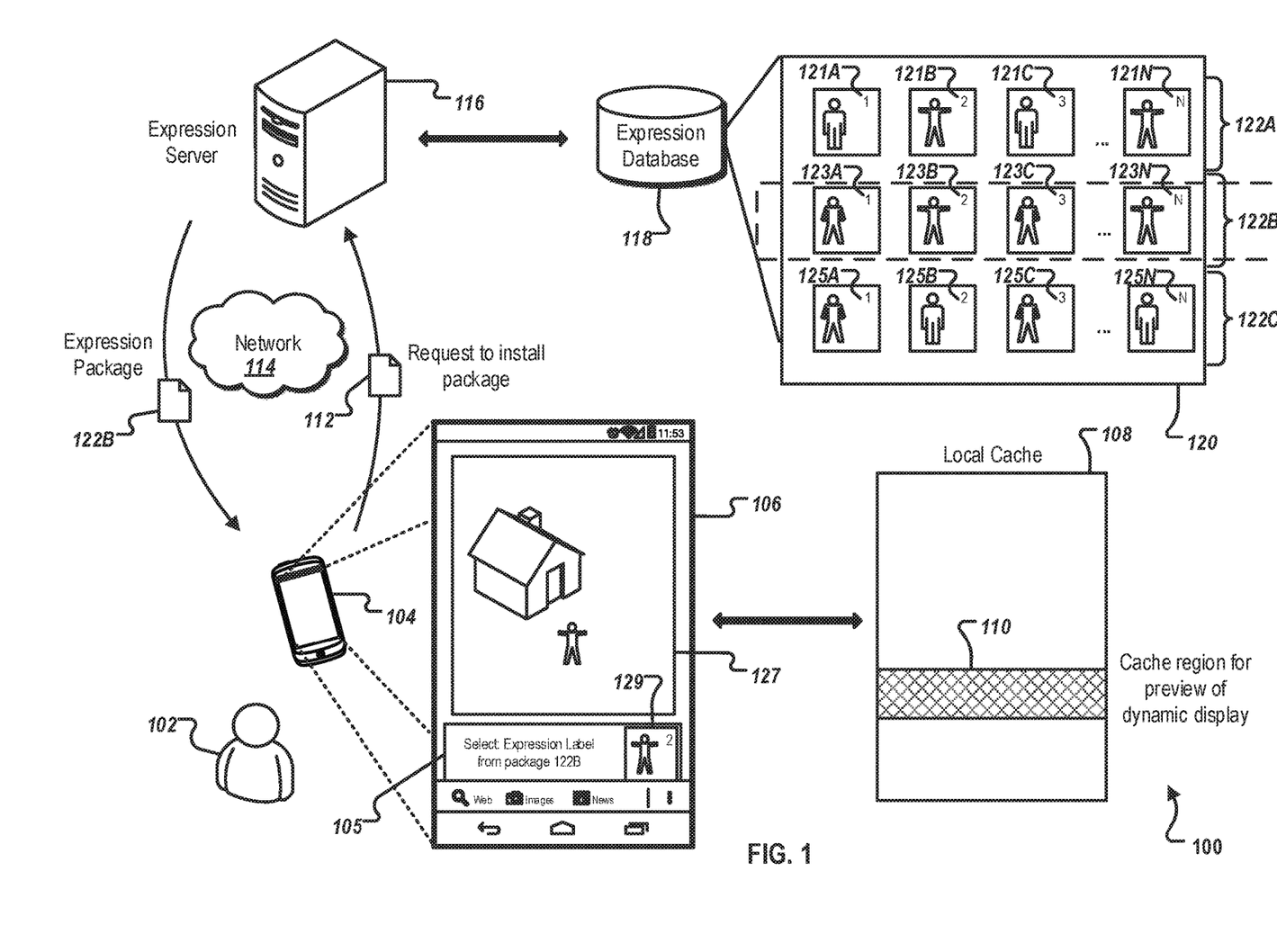
FIG. 1 is a block diagram illustrating an example of a system for permitting preview of a dynamic image that includes several frames of data, according to an implementation of the present disclosure.

FIG. 1 is a block diagram illustrating an example of a system 100 permitting preview of a dynamic image that includes several frames of data, according to an implementation of the present disclosure. In some implementations, the system 100 provides a method for previewing a dynamic image. System 100 includes user 102, a client device 104, a network 114, an expression server 116, and an expression database 118. A user 102 can utilize a social application on a client device 104. For example, the client device 104 can include a social application such as WHATSAPP, FACEBOOK, or instant messenger application (IM APP). The client device 104 includes a display 106 to display the social application and a preview of the dynamic image as selected by the user.

In some implementations, a user 102 can initiate a download of the social application on the client device 104. In response to the user 102 initiating the download of the social application on the client device 104, the client device 104 transmits a request 112 to an expression server 116 over network 114 for an expression package. The social application requires the requested expression package to execute on the client device 104. For example, the expression package can include a dynamic image of a dynamic expression and a network address for acquiring a downloaded frame number of the dynamic image. The dynamic image can be a person running, a face showing a change between facial expressions, or a person performing jumping jacks in a workout routine.

In some implementations, the expression server 116 receives the request 112 from the client device 104 and retrieves the corresponding expression package from the expression database 118. The expression database 118 includes a set of expression packages 122A through 122N. As mentioned previously, each expression package includes a dynamic image illustrating an action. For instance, expression package 122A illustrates a dynamic image of a user performing jumping jacks; expression package 122B illustrates a dynamic image of a user stretching his or her arms; and, expression package 122C illustrates a dynamic image of a user stretching his or her legs. Each expression package 122 includes one or more frames to create the dynamic image. For instance, expression package 122A includes frames 121A through 121N; expression package 122B includes frames 123A through 123N; and, expression package 122C includes frames 125A through 125N.

In some implementations, the client device 104 sends a request 112 for installation package 122B. The request 112 can include an indication of the expression package to retrieve or a description of the expression package to receive. The expression server 116 retrieves expression package 122B from the expression database 118 and transmits expression package 122B to the client device 104 over the network 114. In response to the client device 104 receiving the expression package 122B, the social application on the client device 104 allocates memory 110 in a local cache 108 of the client device 106. The social application sets the allocated memory 110 in the local cache 108 for storing the preview image of the dynamic image. For example, the size of allocated memory 110 can range from 1 KB to 10 MB, depending upon the size of one static image, such as image 123A, in the expression package 122B.

In some implementations, user 102 can select in label 129 in the box 105 in the social application on the client device 104. In response to the user 102 selecting label 129 in the social application, the social application displays a preview image 127 on the display 106 of the client device 104. The social application retrieves the preview image 127 to display from allocated memory 110 in the local cache 108.

Figure 2:
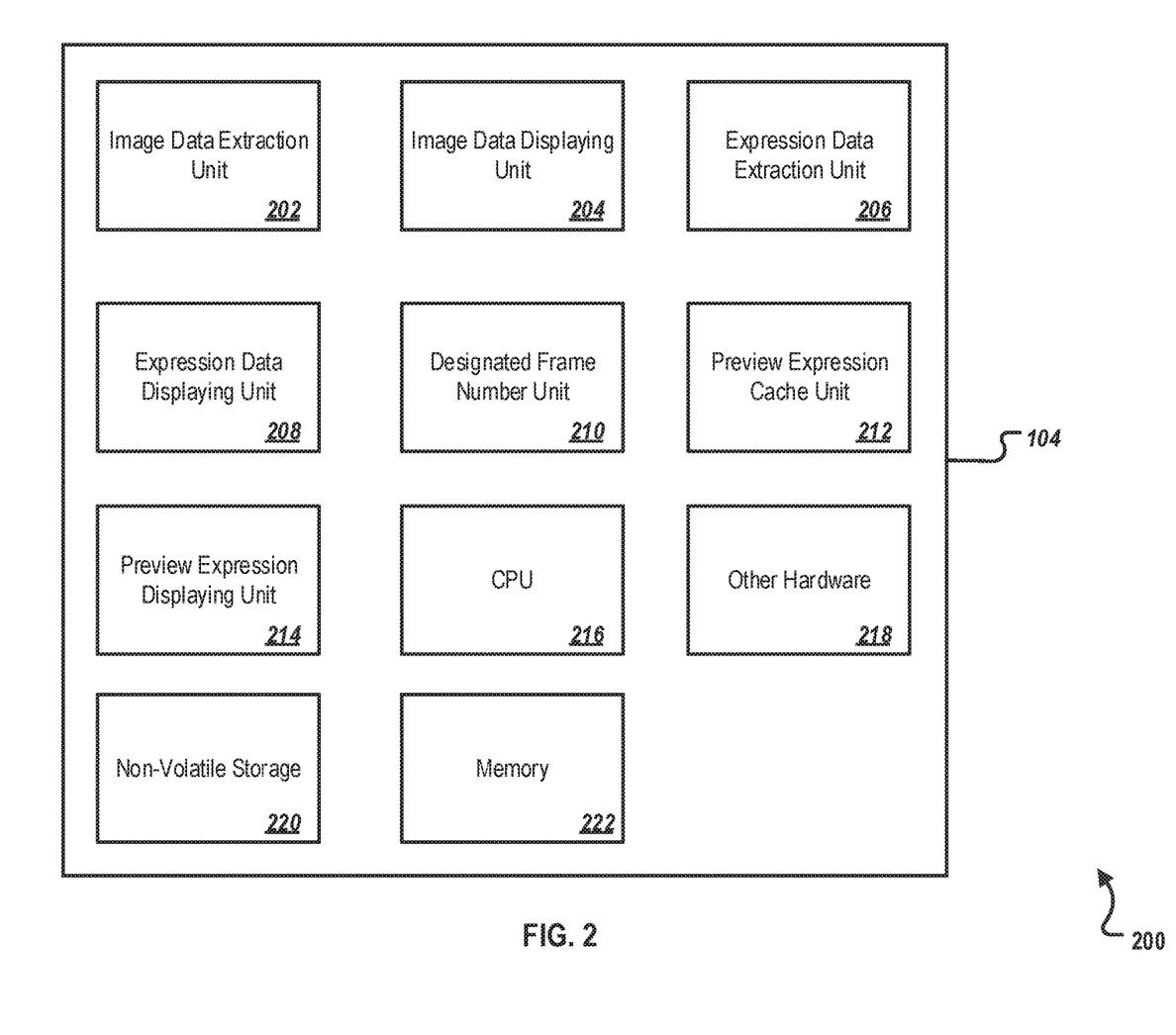
FIG. 2 is a block diagram illustrating an example of a system for displaying an expression package, according to an implementation of the present disclosure.

FIG. 2 is a block diagram illustrating an example of a system 104 for displaying an expression package, according to an implementation of the present disclosure. The system 104 is illustrated in system 100 of FIG. 1 for previewing an image of the dynamic expression. The client device 104 includes an image data extraction unit 202, an image data displaying unit 204, an expression data extraction unit 206, an expression data displaying unit 208, a designated frame number unit 210, a preview expression cache unit 212, a preview expression displaying unit 214, a CPU 216, other hardware 218, non-volatile memory storage 220, and memory 222. The client device 104 can be implemented through software, and can be implemented through hardware or a combination of hardware and software. In an example, the client device 104 executes software by reading a corresponding computer program stored by the Central Processing Unit (CPU) 216 of the client device 104. The CPU 216 utilizes the various components of the client device 104 to execute the corresponding computer program.

In some implementations, the client device 104 includes other hardware 218 for executing the software stored on the CPU 216. The other hardware 218 includes a processor for receiving and transmitting wireless signals, a network interface (for example, a board or card) used for implementing network communication functions, and one or more receptacles for receiving data from high-definition multimedia interface (HDMI), universal serial bus (USB), or other data inputs.

In some implementations, the image data extraction unit 202 is configured to extract at least one frame of a static image having a designated frame number from the dynamic image. For instance, as illustrated in FIG. 1, the image extraction unit 202 in the client device 104 extracts image 129 with a designated frame number 121B of 2. In some implementations, the image data displaying unit 204 is configured to display the extracted static image data retrieved from the image data extraction unit 202. For instance, as illustrated in FIG. 1, the image data displaying unit 204 in the client device 104 displays the image 129 with a designated frame number 121B of 2 to the display 106 as a preview image 127.

In some implementations, the designated frame number, such as frame number 121B, includes an issued frame number of the dynamic image acquired from the Internet, a locally stored built-in frame number of the dynamic image, or a default frame number.

In some implementations, the device can include a designated frame number unit 210 configured to acquire the issued frame number of the dynamic image from the Internet based on a preset address, to serve as the designated frame number. The designated frame number unit 210 uses a locally stored built-in frame number of the dynamic image as the designated frame number if the issued frame number of the dynamic image cannot be acquired. If the designated frame number unit 210 is not found, the designated frame number unit 210 can use the default frame number as the designated frame number of the dynamic image.

In some implementations, in the designated frame number, a 0 or −1 represents the last frame of static image data of the dynamic image. The number N in the designated frame number represents the Nth frame of static image data of the dynamic image if N is not greater than the maximum frame number of the dynamic image. In addition, N can also represent the last frame of static image data of the dynamic image if N is greater than the maximum frame number of the dynamic image. N can be any real or natural number.

In some implementations, the device 104 can include a preview expression cache unit 212 and a preview expression displaying unit 214. The preview expression cache unit 212 is configured to generate a preview image according to the extracted static image data, and cache the generated preview image. For instance, the preview expression cache unit 212 generates the cached preview image 127 from the local cache 108 of the client device 104. In addition, the preview expression cache unit 212 caches the generated preview image in the allocated memory 110 of the local cache 108. The preview expression displaying unit 214 is configured to, when previewing the dynamic image, display the cached preview image if the preview image of the dynamic image is found in the allocated memory 110 of the local cache 108.

In some implementations, the dynamic image includes a dynamic expression in an expression package. An installation file of the expression package, such as expression package 122B, includes a built-in frame number that corresponds to the dynamic expression and used as the designated frame number. In other implementations, the installation file can include multiple dynamic expressions and multiple groups of built-in frames. Each dynamic expression corresponds to one group of built-in frames. Each of the built-in frames includes a built-in frame number.

In some implementations, the expression package includes at least one dynamic image that includes one or more frames of static image data. The client device 104 as illustrated in FIG. 2 includes an expression data extraction unit 206 and an expression data displaying unit 208. For instance, the expression data extraction unit 206 is configured to extract at least one frame of static image data having a designated frame number from the to-be-displayed dynamic expression. For example, the expression data extraction unit 206 is configured to extract a frame of static image data from the to-be-displayed dynamic expression 122B having a designated frame number 123B of 2. The expression data displaying unit 208 is configured to display the dynamic expression by using the extracted static image data. For example, the expression data displaying unit 208 displays the dynamic expression on the display 106 of the client device 104.

In some implementations, the designated frame number includes an issued frame number of the dynamic expression acquired from the Internet, a built-in frame number of the dynamic expression included in the expression package, or a default frame number. For example, the designated frame number can be included in the static image data of an expression package, such as designated frame number 121B in the expression package 122B.

In some implementations, the client device 104 includes a designated frame number unit 210 configured to acquire the issued frame number of the dynamic expression from the Internet based on a preset address, to serve as the designated frame number. In some implementations, if the designated frame number unit 210 cannot acquire the issued frame number of the dynamic image, the designated frame number unit 210 uses the built-in frame number of the dynamic expression included in the expression package as the designated frame number. If the designated frame number unit 210 does not find the built-in frame number of the dynamic expression, the designated frame number unit 210 uses the default frame number as the designated frame number of the dynamic expression. For example, the issued frame number can be a number needed to download the dynamic expression package from a preset address. The built-in frame number is included in the dynamic expression package. The designated frame number is used to extract a frame of a dynamic expression in the dynamic expression package. In an example, a dynamic expression package can include three dynamic expressions. Each dynamic expression includes a set of designated frame numbers and corresponding static images. The dynamic expression package can arrange or order its static images according to the designated frame number or a built-in frame number.

In some implementations, the client device 104 includes a preview expression cache unit 212 and a preview expression displaying unit 214. The preview expression cache unit 212 is configured to generate a preview expression corresponding to the dynamic expression according to the extracted static image data, and cache the generated preview expression. Additionally, the preview expression displaying unit 214 is configured to, when a preview expression corresponding to the to-be-displayed dynamic expression is found, display the dynamic expression by using the preview expression. For example, the to-be-displayed dynamic expression can include a status that the dynamic expression will be displayed to a user.

In some implementations, a dynamic image is generally formed by combining a plurality of static images having different content. For instance, the dynamic image includes image data of the static images. The image data of each static image is a frame, and a dynamic effect is presented by displaying the static image data frame-by-frame. A preview image of the dynamic image can generally be considered to be one of the static images, and the image data of the static image has been included in the dynamic image. As previously stated, image data of a preview image of a dynamic expression in an expression package is repeated information, and the size of an installation file may be reduced by removing the repeated information.

Figure 3:
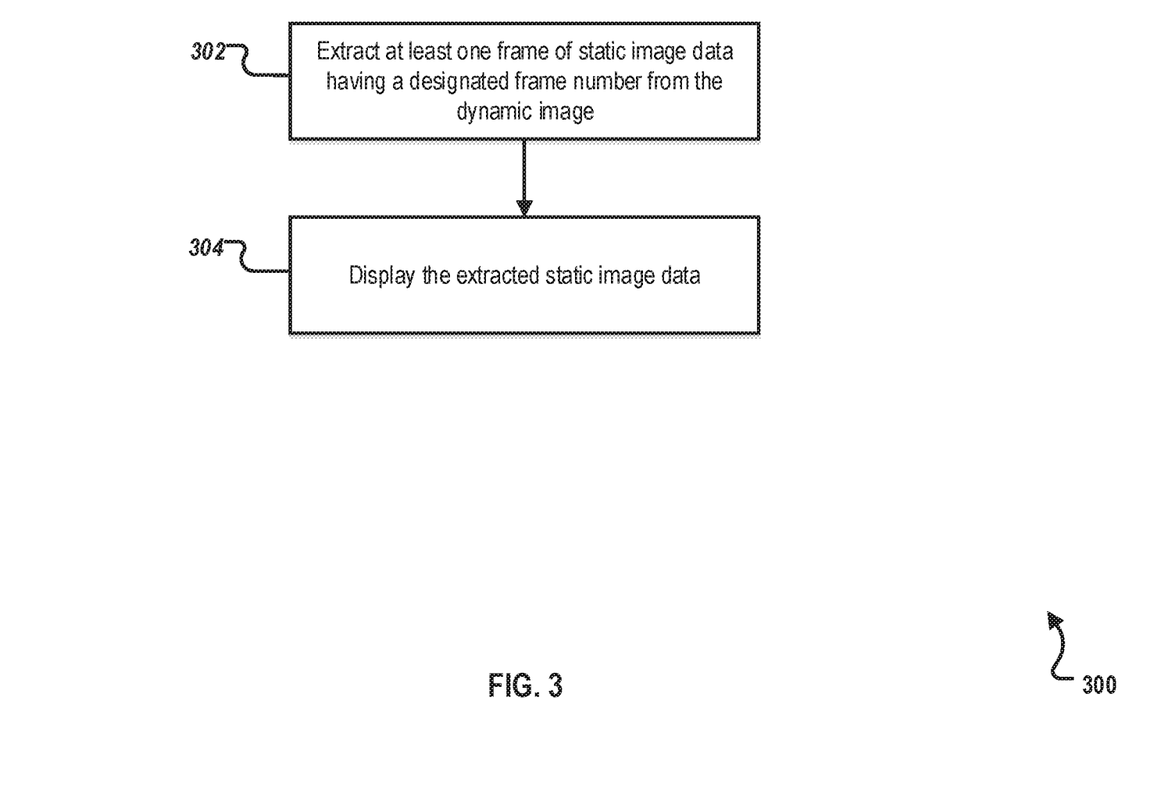
FIG. 3 is a flowchart illustrating an example of a method for previewing a dynamic image, according to an implementation of the present disclosure.

FIG. 3 is a flowchart illustrating an example of a method 300 for previewing a dynamic image, according to an implementations of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, the image data extraction unit 202 extracts at least one frame of static image data having a designated frame number from the dynamic image. In some implementations, the image data extraction unit 202 acquires a dynamic image from the Internet in real time or acquires a dynamic image stored locally in the device. The dynamic image can include at least two frames of static image data, where each frame of static image data includes a respective frame number. For example, the static image data has a respective frame number, such as frame number 123B. The image data displaying unit 204, during displaying of the dynamic image, displays a dynamic effect that can be presented when displaying static image data in ascending order of frame numbers. Multiple specific implementations of extracting static image data having one frame number or multiple frame numbers from a dynamic images are provided below.

In some implementations, a designated frame number can be a single frame number. The designated frame number can also be two or more frame numbers. In the case where the designated frame number can be two or more frame numbers, the image data extraction unit 202 extracts two or more frames of static image data and the image data displaying unit 204 provides a dynamic preview of the two or more extracted frames of static image data to the display 106.

In some implementations, the designated frame number can be determined in various ways according to different application scenarios of utilizing a preview image. For example, when software or an application that needs to preview a dynamic image executes a dynamic image previewing function, an issued frame number of the dynamic image is acquired from the Internet by using a preset address, and the issued frame number is used as the designated frame number. For example, the preset address can be an Internet Protocol (IP) address for a Uniform Resource Locator (URL). The URL site can include the issued frame number. A terminal can access the URL site and download the issued frame number. A built-in frame number of the dynamic image can be stored locally on the client device 104 and the client device 104 uses the issued frame number as the designated frame number. For example, a client device 104 retrieves a dynamic expression from an expression package. Each dynamic expression in the expression package, such as expression package 122B, includes a built-in frame number corresponding to each dynamic expression. An installation file retrieved by the client device 104 includes a dynamic expression that corresponds to the built-in frame number. Moreover, a default frame number can be set, and the default frame number is used as the designated frame number.

In some implementations, the client device 104 utilizes various methods to acquire the issued frame number from the Internet by using a preset address. In this way, using the preset address can control previewing effects of various dynamic images in a concentrated manner at the network side. A displayed preview image can be modified as required without changing a setting on each client terminal 104. However, previewing the dynamic image is delayed when the network speed between the client device 104 and the expression server 116 is relatively slow. The manner of using a locally stored built-in frame number can create an impact avoidance of network conditions on previewing of the dynamic images, thus creating an efficient method to preview dynamic images and preserving network traffic. However, pre-configuring a corresponding built-in frame number into the client device 104 creates an efficiency improvement and saves network traffic. Additionally, the system can preview an implementation of previous dynamic images, such as dynamic images without issued frame numbers provided by the network or pre-configured built-in frame numbers stored locally in the client device 104.

In some implementations, the built-frame number and the default frame number can be combined to form a designated frame number. A built-in frame number of a dynamic image can be searched in the local cache 208 of the client device 104. If the client device 104 finds the built-in frame number of a dynamic image in the local cache 208, the client device 104 uses the built-in frame number of the dynamic image as the designated frame number. If the client device 104 does not find the built-in frame number of the dynamic image in the local cache 208, the client device 104 uses a default frame number as the designated frame number of the dynamic image. For another example, the issued frame number and the default frame number can be combined.

In some implementations, the image data extraction unit 202 acquires an issued frame number of a dynamic image from the Internet by using a preset address to serve as the designated frame number of the dynamic image. If the image data extraction unit 202 cannot acquire the issued frame number of the dynamic image from the Internet, the image data extraction unit 202 sets the designated frame number of the dynamic image as a default frame number.

In some implementations, a designated frame number can be determined by combining the three previously mentioned methods. For instance, the image data extraction unit 202 acquires an issued frame number of a dynamic image from the Internet by using a preset address to server as the designate frame number of the dynamic image. If the image data extraction unit 202 cannot acquire the issued frame number from the Internet, the image data extraction unit 202 utilizes a locally stored built-in frame number of the dynamic image as the designated frame number. If the image data extraction unit 202 does not find the built-in frame number of the dynamic image, the image data extraction unit 202 uses the default frame number as the designated frame number of the dynamic image.

In some implementations, the quantities of static image frames included in different dynamic images vary significantly. As a result, a rule can be set for the designated frame number, such that by setting a default frame number, a previewing failure utilizing an incorrect frame number can be avoided. For example, frame numbers of static image data in a dynamic image generally ascend from 1 to M (M is a real number), and the rule of setting the designated frame number can be set as follows—0 or −1 or a combination of 0 and −1 set in the designated frame number represents the last frame. The number N, represented in the designated frame number, represents the Nth frame if N is not greater than the frame number of the last frame of the dynamic image, and represents the last frame if N is greater than the frame number of the last frame of the dynamic image. In this way, the default frame number can be 1, such that the first frame is used for previewing, can be 0 or 1 such that the last frame is used for previewing, and can also be (1, 0) or (1, −1) such that a dynamic image formed by the first frame and the last frame is used for previewing. Additionally, the client device 104 can preview the dynamic image even if an issued frame number, a built-in frame number, or a default frame number exceeds the maximum frame number of the dynamic image. From 302, method 300 proceeds to 304.

At 304, the image data displaying unit 204 displays the extracted static image data. As discussed in 302, the image data displaying unit 204 displays the static image data to the user as image data in a preview image. In some implementations, a preview image can be generated according to one or more extracted static image data from a dynamic image. The image data extraction unit 202 caches the generated preview image in the local cache 108. When the dynamic image is previewed, the image data extraction unit 202 searches the local cache 108 to check whether the preview image is stored in the cache. If the image data extraction unit 202 determines the local cache 108 stores the preview image of the dynamic image, the image data displaying unit 204 displays the cached preview image. If the image data extraction unit 202 determines the local cache 108 does not contain the preview image of the dynamic image, the image data extraction unit 202 and the image data displaying unit 204 extract and display the static image data, respectively. In addition, the image data displaying unit 204 generates a preview image of the extracted static image data and stores the preview image into the local cache 208.

If the designated frame number is a single frame number, the image data displaying unit 204 generates a static preview image by using the extracted single frame of static image data. For instance, the image data displaying unit 204 generates a static preview image of the extracted single frame of static image data from expression package 122B with the frame number 123C of 3. If the designated frame number includes two or more frame numbers, such as frame numbers 123B and 123C, the image data displaying unit 204 generates a dynamic preview image by using the extracted two or more frames of static image data. A variety of specific implementations of generating a static preview image by using a single frame of static image data and generating a dynamic preview image by using more than one frame of static image data has been previously described.

In some implementations, a preview image of the dynamic image in the local cache 108 can be displayed for the user 102 when the user 102 requests for a preview of the dynamic image. In some implementations, the client device 102 to display a static preview image can utilize an existing static player, and the client device 102 to display a dynamic preview image can utilize an existing dynamic player. Additionally, the existing image player supporting both dynamic images and static images can be used to display the preview image. For example, an existing static player can include ADOBE or MICROSOFT PAINT; an existing dynamic player can include ADOBE or QUICKTIME. An existing image player can include ADOBE, WINDOWS MEDIA PLAYER, and VLC MEDIA PLAYER, to name a few examples.

In some implementations, the client device 104 can include a large-capacity non-volatile storage 220. The non-volatile storage 220 can include the local cache region 108. The allocated memory 110 in the local cache region 108 can be included in the non-volatile storage 220 to reduce the processing time to generate the preview image and improve the efficiency of previewing the dynamic image. The efficiency is improved because non-volatile storage 220 is typically used as a system's RAM for quick and reliable access to data.

In some implementations, the system 100 can implement a static or dynamic previewing function using the static image data as provided from the dynamic image. When the system 100 utilizes an expression package, such as expression package 122B, the system 100 does not configure a dynamic image in an installation file transmitted to the client device 104. Rather, only one or two static images from the expression package can be used to generate a corresponding preview image from the expression package. As a result, the size of the expression package in the installation file transmitted to the client device 104 is reduced and network traffic is reduced during downloading of the installation file because the installation file is smaller in size. Moreover, the installation package creating personnel does not need to generate a preview image for each dynamic expression, thus also reducing the workload during creation of the expression package.

In some implementations, the present application utilizes a device, such as a client device 104 that downloads an expression package installation file and completes the expression package. For instance, the expression package installation file is expression package 122B. The client devices 104 display the dynamic expression by using partial static image data in the dynamic expression. In this way, when an expression in an expression package is displayed on a client device 104 of a user, the displaying can be implemented by using the dynamic expression itself, thus reducing the size of an expression package installation file and reducing the workload during a creation of the expression package. Additionally, when the user 102 selects the expression package on the client device 104, the client device 104 displays the expression package to the user, for the user to preview expressions from the expression package.

In some implementations, the expression package installation file and an expression package file on the client device 104 include at least one dynamic expression. However, the client device 104 does not include a preview expression corresponding to each dynamic expression. Rather, one preview expression can be stored for each dynamic expression. Each dynamic expression includes a dynamic image including at least two frame of static image data that each include respective frame numbers. After 304, method 300 stops.

Figure 4:
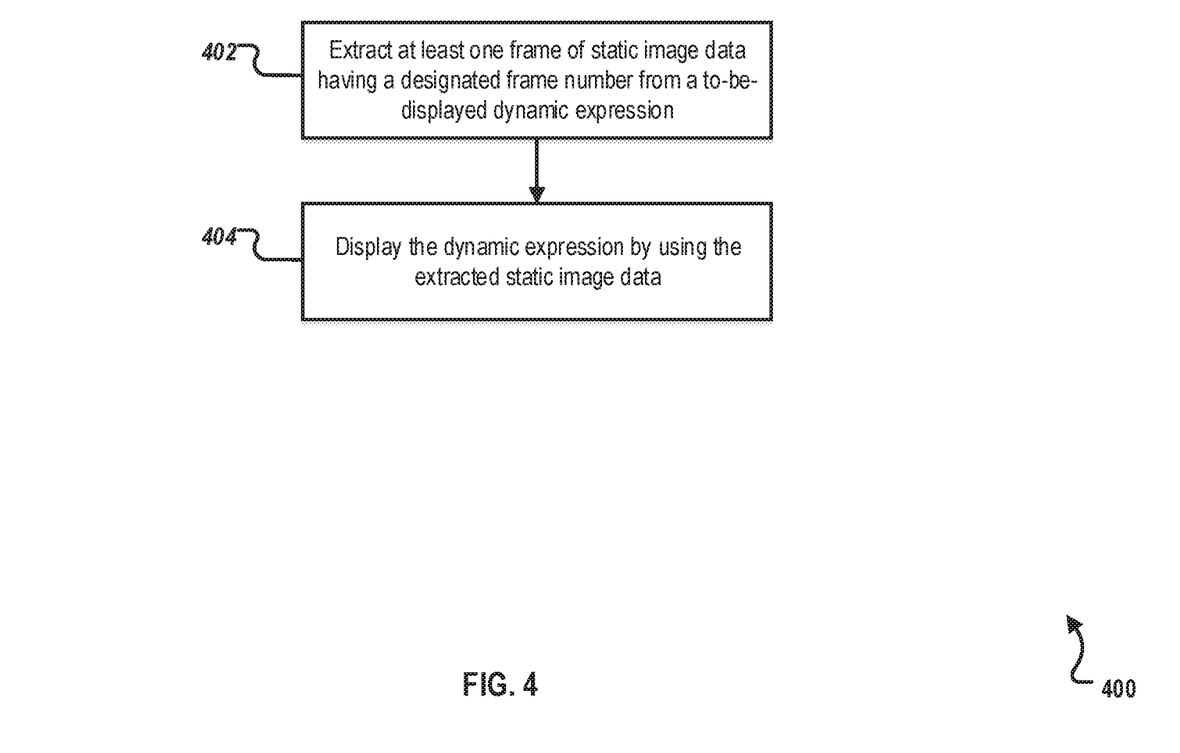
FIG. 4 is another flowchart illustrating an example of a method for previewing a dynamic image, according to an implementation of the present disclosure.

FIG. 4 is a flowchart illustrating an example of another method 400 for previewing a dynamic image, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 300 can be run in parallel, in combination, in loops, or in any order.

At 402, the expression data extraction unit 206 extracts at least one frame of static image data having a designated frame number from a to-be-displayed dynamic expression. According to the quantity of expressions in the expression package and an interface design of social software using expressions, expressions displayed to the user 102 from the client device 104 can include all expressions from an expression package or a partial set of expressions. The expression data extraction unit 206 extracts at least one frame of static image data to-be-displayed dynamic expression according to the designated frame number. The designated frame number can be a single frame number used for statically displaying an expression. Alternatively, the designated frame number can be two or more frame numbers used for dynamically displaying an expression.

In some implementations, the designated frame number can be determined in various manners. For instance, an issued frame number of the dynamic expression can be acquired from the Internet; a built-in frame number of the dynamic expression can be included in the expression package; or, a default frame number can be used as the designated frame number.

In some implementations, for the issued frame number, a preset address for downloading the issued frame number can be pre-configured in the expression package. [Alternatively, a preset address for acquiring the issued frame number can be built in social software using the expression package, and an issued frame number of each dynamic expression can be acquired using a global expression identifier. For example, a unique identifier possessed by each dynamic expression in an expression package can be a global expression identifier.

In another example, an expression package identifier can be a unique identifier of the expression package among all expression packages.

In some implementations, for the built-in frame number corresponding to each dynamic expression can be included in an expression package installation file. After the client device 104 installs the expression package received from the expression server 116, the built-in frame number of each dynamic expression is stored in the local expression package memory of the client device 104.

In some implementations, for the default frame number, a used default frame number can be set for the expression package or for the social software using the expression package. For example, the social application can utilize the first static image data of the dynamic expression as the default frame number.

In some implementations, the designated frame number can be determined by combining the previously described three frame numbers. Specifically, the designated frame number unit 210 acquires an issued frame number of a dynamic expression from the Internet based on a preset address, to server as the designated frame number. If designated frame number unit 210 cannot acquire the issued frame number of the dynamic expression, the designated frame number unit 210 sets the designated frame number as the built-in frame number of the dynamic expression included in the expression package. If the designated frame number unit 210 cannot find the built-in frame number, the designated frame number unit 210 uses a default frame number can be set as the designated frame number of the dynamic expression. From 402, method 400 proceeds to 404.

At 404, the expression data displaying unit 208 displays the dynamic expression using the extracted static image data. As expression packages generally need to be displayed in social software frequently, a preview expression cache unit 212 generates a preview expression corresponding to a dynamic expression corresponding to static image data extracted from the dynamic expression. In addition, the preview expression cache unit 212 caches the generated preview expression. When the expression package is displayed on client device 104, for a to-be-displayed dynamic expression, the preview expression cache unit 212 is configured to search the local cache 108 to check whether there is a preview expression corresponding to the dynamic expression. If the preview expression cache unit 212 determines the preview expression corresponding to the dynamic expression is found, the preview expression displaying unit 214 displays the dynamic expression. If the preview expression cache unit 212 determines the preview expression corresponding to the dynamic expression is not found, then 402 is repeated again to extract and display static image data, generate a preview expression according to the extracted dynamic image data, and store the preview expression in the local cache 108.

In some implementations, the local cache 108 can store the expression package on the client device 104. In this way, a preview expression cache unit 210 generates a preview expression for each dynamic expression when the dynamic expression is displayed for the first time and the generated preview expression can be displayed in subsequent preview displays, thereby reducing the computing load of the device and improving the efficiency of displaying the expression package.

In some implementations, the preview expression displaying unit 214 displays an expression package by using extracted static image data in a dynamic expression. In addition, it is unnecessary for the preview expression cache unit 212 to configure a corresponding preview expression for each dynamic expression in an expression package installation file. Rather, only one preview expression needs to be generated for each dynamic expression. Thereby, reducing the computing load of the client device 104 and improving the processing efficiency with which the client device 104 displays the expression package.

Figure 5:
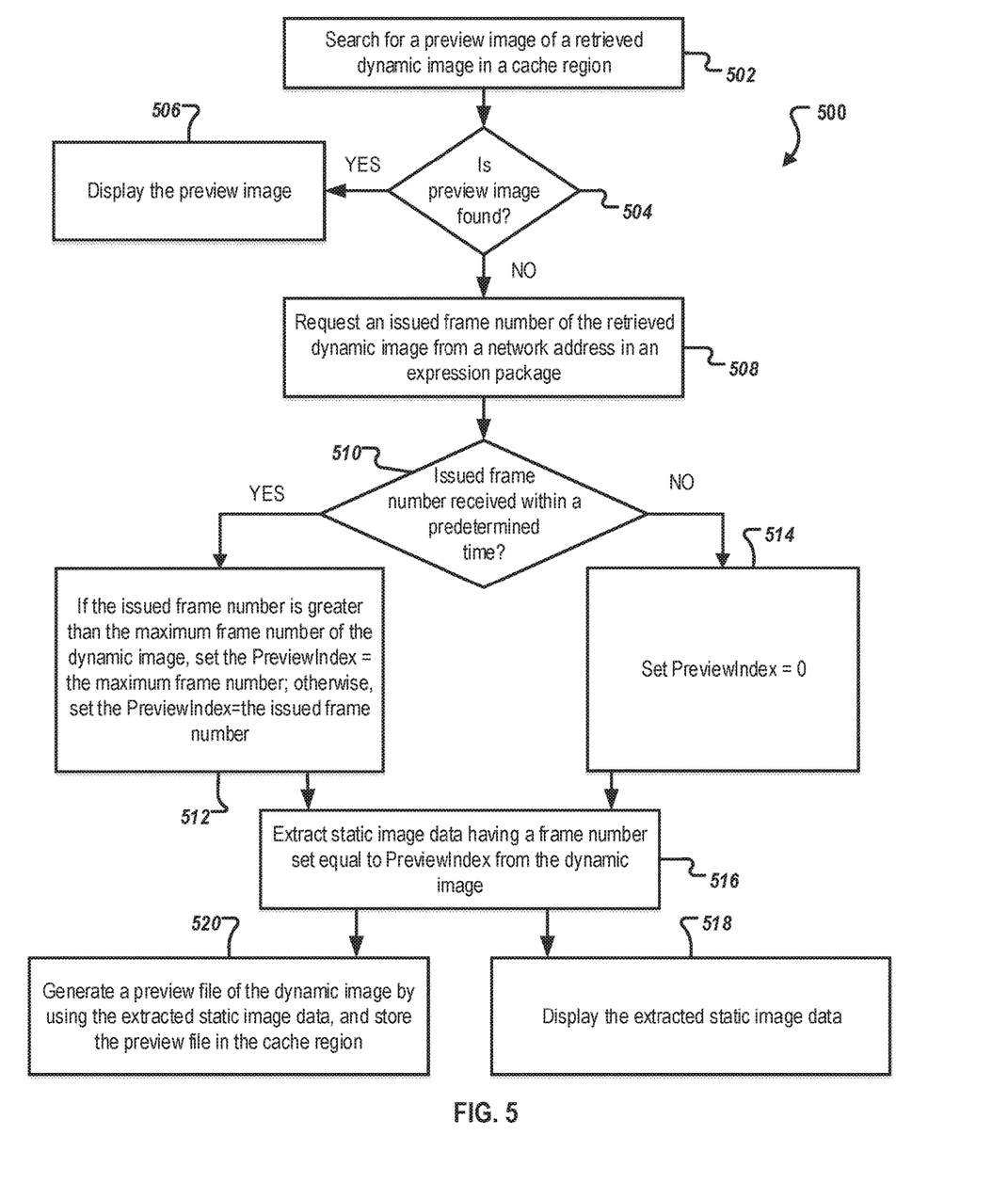
FIG. 5 is another flowchart illustrating an example of a method for previewing a dynamic image, according to an implementation of the present disclosure.

FIG. 5 is another flowchart illustrating an example of a method 500 for previewing a dynamic image, according to an implementations of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, the image data extraction unit 202 searches for a preview image of a retrieved dynamic expression in the local cache region 108. From 502, method 500 proceeds to 504.

At 504, a determination is made as to whether the image data extraction unit 202 finds the preview image in the local cache 108. If it is determined that the image data extraction unit 202 finds the preview image in local cache 108, then method 500 proceeds to 506, and the image data displaying unit 204 displays the preview image on the display 106. Otherwise, if it is determined that the image data extraction unit 202 is not found in the local cache 108, then method 500 proceeds to 508. From 504, method 500 proceeds to 508.

At 508, the designated frame number unit 510 acquires a network address of the expression package and the designated frame number unit 410 requests an issued frame number of the retrieved dynamic image from the network address. From 508, method 500 proceeds to 510.

At 510, a determination is made as to whether the issued frame number is returned by the network address within a predetermined time. If it is determined that the issued frame number is returned by the network address within a predetermined time, then method 500 proceeds to 512, and the image data extraction unit 202 checks to see if the issued frame number received from the network address is greater than a maximum frame number of the dynamic image, and if this is the case, the image data extraction unit 202 sets the maximum frame number of the dynamic image as the designated frame number. Otherwise, if the issued frame number returned by the network address is not greater than the maximum frame number of the dynamic image, the image data extraction unit 202 sets the issued frame number as the designated frame number for previewing. Otherwise, if at 510, if it is determined that the issued frame number is not returned by the network address within a predetermined time, then method 500 proceeds to 514, and the image data extraction unit 202 uses a default frame number of 0 as the designated frame number, where 0 represents the last frame of static image data of the dynamic image. For example, the image data extraction unit 202 can use the frame that includes the frame number 121N, as shown in FIG. 1. From 512 and 514, the method 500 proceeds to 516.

At 516, the image data extraction unit 202 extracts a static image having the set designated frame number from the dynamic image. For example, an open source component, such as GIFDrawable is invoked to load the dynamic image into the local cache 108, and the static image data having the designated frame number is extracted by the image data extraction unit 202 from the local cache 108. From 516, method 500 proceeds to 518 and 520.

At 518, the image data displaying unit 204 displays the extracted static image data to the display 106 of the client device 104. For example, the extracted static image data is placed in an image container, such as ImageView provided by an ANDROID operating system and the preview static image data is displayed to the user 102.

At 520, the image data extraction unit 202 generates a preview file of the extracted static image data, and the image data extraction unit 202 stores the generated preview file in the local cache 108. In this way, when the dynamic image needs to be subsequently previewed by user 102 on the client device 104, the image data extraction unit 202 reads the preview file from the local cache region 108 and the image data displaying unit 204 displays the preview file directly.

Figure 6:
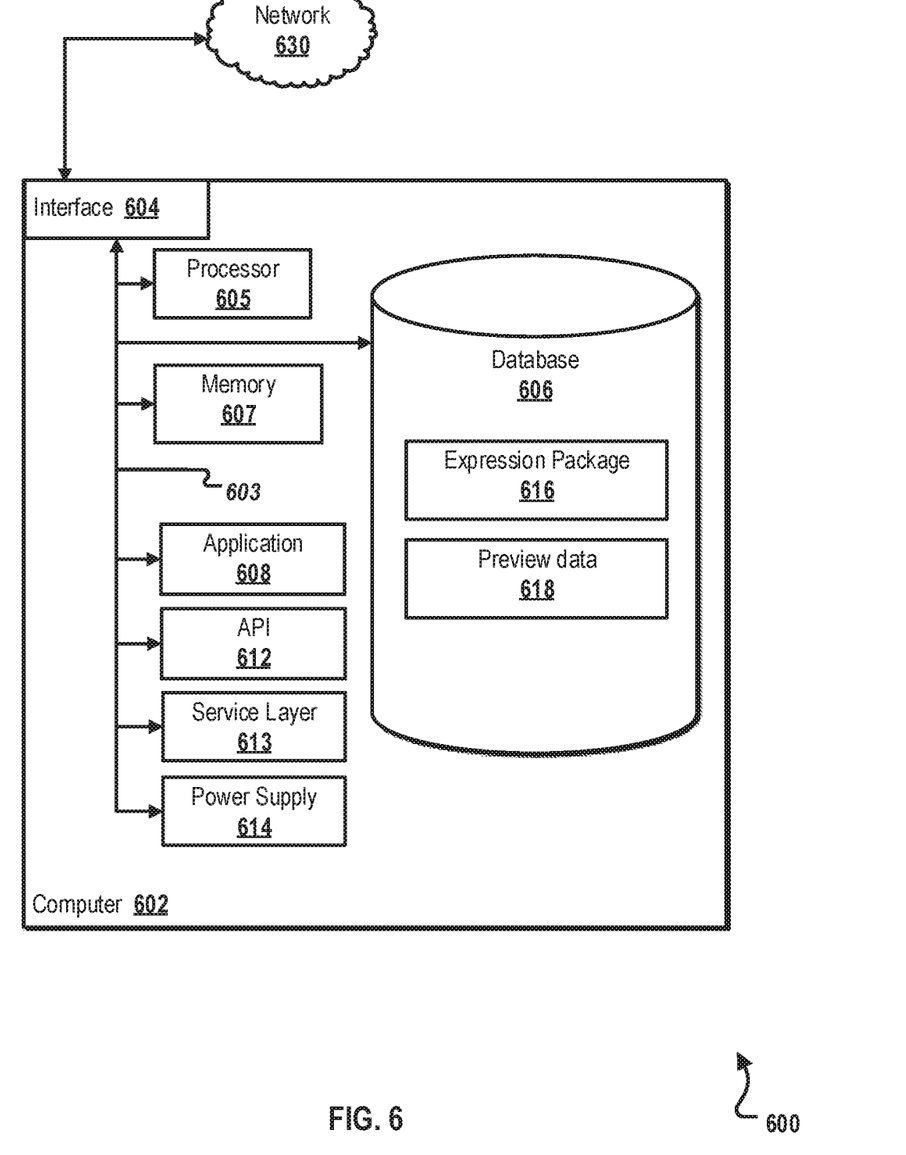
FIG. 6 is a block diagram illustrating an example of a computer-implemented system used to provide computational functionalities associated with described algorithms, methods, functions, processes, flows, and procedures, according to an implementation of the present disclosure.

FIG. 600 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 602 can include an input device, such as a keypad, keyboard, touch screen, another input device, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as a client, network component, a server, a database or another persistency, another role, or a combination of roles for performing the subject matter described in the present disclosure. The illustrated Computer 602 is communicably coupled with a Network 630. In some implementations, one or more components of the Computer 602 can be configured to operate within an environment, including cloud-computing-based, local, global, another environment, or a combination of environments.

At a high level, the Computer 602 is an electronic computing device operable to receive, transmit, process, store, or manage data and information associated with the described subject matter. According to some implementations, the Computer 602 can also include or be communicably coupled with a server, including an application server, e-mail server, web server, caching server, streaming data server, another server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory, conventional, or another type of database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. As illustrated, the Database 606 holds the previously described expression package 616 and preview data 618.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: determining a location of a preview image of a dynamic image is not stored in memory; transmitting, in response to determining the preview image is not stored in the memory, a request for a frame number of at least one static image included in the dynamic image to an acquired network address; receiving an issued frame number from the network address and setting the issued frame number as a designated frame number for the at least one static image; extracting the at least one static image having the set designated frame number; and displaying the at least one static image having the set designated frame number as the preview image to a user.

The foregoing and other described implementations can each, optionally, include one or more of the following features:

A first feature, combinable with any of the following features wherein determining the location of the preview image of the dynamic image is not stored in the memory further comprises obtaining the network address of an expression package that includes the dynamic image.

A second feature, combinable with any of the previous or following features, wherein the designated frame number comprises an issued frame number of the dynamic image, a locally stored built-in frame number of the dynamic image, or a default frame number.

A third feature, combinable with any of the previous or following features, further comprising determining whether the issued frame number is received from the network address within a predetermined time.

A fourth feature, combinable with any of the previous or following features, further comprising, in response to determining that the issued frame number is received from the network address within the predetermined time, determining if the received issued frame number is greater than a maximum frame number of the dynamic image.

A fifth feature, combinable with any of the previous or following features, further comprising, in response to determining that the issued frame number is not received from the network address within the predetermined time, setting a last frame of static image data of the dynamic image as the set designated frame number for the preview image.

A sixth feature, combinable with any of the previous or following features, wherein extracting the at least one static image having the set designated frame number further comprises: generating a preview image corresponding to the extracted at least one static image; and caching the generated preview image in memory.

A seventh feature, combinable with any of the previous or following features, wherein the dynamic image comprises a dynamic expression in an expression package.

An eighth feature, combinable with any of the previous or following features, wherein the expression package includes an installation file comprising a built-in frame number that corresponds to the dynamic expression and used as the designated frame number.

In a second implementation, a non-transitory, computer-readable medium storing one or more instructions executable by a computer system to perform operations comprising: determining a location of a preview image of a dynamic image is not stored in memory; transmitting, in response to determining the preview image is not stored in the memory, a request for a frame number of at least one static image included in the dynamic image to an acquired network address; receiving an issued frame number from the network address and setting the issued frame number as a designated frame number for the at least one static image; extracting the at least one static image having the set designated frame number; and displaying the at least one static image having the set designated frame number as the preview image to a user.

The foregoing and other described implementations can each, optionally, include one or more of the following features:

A first feature, combinable with any of the following features, wherein determining the location of the preview image of the dynamic image is not stored in the memory further comprises obtaining the network address of an expression package that includes the dynamic image.

A second feature, combinable with any of the previous or following features, wherein the designated frame number comprises an issued frame number of the dynamic image, a locally stored built-in frame number of the dynamic image, or a default frame number.

A third feature, combinable with any of the previous or following features, further comprising determining whether the issued frame number is received from the network address within a predetermined time.

A fourth feature, combinable with any of the previous or following features, further comprising, in response to determining that the issued frame number is received from the network address within the predetermined time, determining if the received issued frame number is greater than a maximum frame number of the dynamic image.

A fifth feature, combinable with any of the previous or following features, further comprising, in response to determining that the issued frame number is not received from the network address within the predetermined time, setting a last frame of static image data of the dynamic image as the set designated frame number for the preview image.

A sixth feature, combinable with any of the previous or following features, wherein extracting the at least one static image having the set designated frame number further comprises: generating a preview image corresponding to the extracted at least one static image; and caching the generated preview image in memory.

A seventh feature, combinable with any of the previous or following features, wherein the dynamic image comprises a dynamic expression in an expression package.

A eighth feature, combinable with any of the previous or following features, where the expression package includes an installation file comprising a built-in frame number that corresponds to the dynamic expression and used as the designated frame number.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: determining a location of a preview image of a dynamic image is not stored in memory; transmitting, in response to determining the preview image is not stored in the memory, a request for a frame number of at least one static image included in the dynamic image to an acquired network address; receiving an issued frame number from the network address and setting the issued frame number as a designated frame number for the at least one static image; extracting the at least one static image having the set designated frame number; and displaying the at least one static image having the set designated frame number as the preview image to a user.

The foregoing and other described implementations can each, optionally, include one or more of the following features:

A first feature, combinable with any of the following features, wherein determining the location of the preview image of the dynamic image is not stored in the memory further comprises obtaining the network address of an expression package that includes the dynamic image.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, the method comprising:
    determining, by one or more processors, that a location of a preview image of a dynamic image is not stored in a memory;
    transmitting, by the one or more processors, in response to determining that the preview image is not stored in the memory, a request for a frame number of at least one static image included in the dynamic image to a network address;
    generating, by the one or more processors, a designated frame number for the at least one static image based on a rule of combining an issued frame number received from the network address and a default frame number of a displaying application;
    extracting, by the one or more processors, the at least one static image having the designated frame number;
    displaying, by the one or more processors, the at least one static image having the designated frame number as the preview image to a user;
    receiving, by the one or more processors, a selection, by a user, of the at least one static image;
    requesting and receiving, by the one or more processors, an expression package that comprises frames of the dynamic image; and
    providing, by the one or more processors, the dynamic image, for display to the user, the dynamic image comprising executing the expression package, comprising beginning the dynamic image at a selected image having the designated frame number.

2. The computer-implemented method of claim 1, wherein determining the location of the preview image of the dynamic image is not stored in the memory further comprises obtaining the network address of the expression package that comprises the dynamic image.

3. The computer-implemented method of claim 1, wherein the designated frame number comprises an issued frame number of the dynamic image, a locally stored built-in frame number of the dynamic image, or a default frame number.

4. The computer-implemented method of claim 1, further comprising determining whether the issued frame number is received from the network address within a predetermined time.

5. The computer-implemented method of claim 4, further comprising, in response to determining that the issued frame number is received from the network address within the predetermined time, determining that the issued frame number is greater than a maximum frame number of the dynamic image.

6. The computer-implemented method of claim 4, further comprising, in response to determining that the issued frame number is not received from the network address within the predetermined time, setting a last frame of static image data of the dynamic image as the designated frame number for the preview image.

7. The computer-implemented method of claim 1, wherein extracting the at least one static image having the designated frame number further comprises:
   generating a preview image corresponding to the at least one static image; and
   caching the preview image in the memory.

8. The computer-implemented method of claim 1, wherein the dynamic image comprises a dynamic expression in an expression package.

9. The computer-implemented method of claim 8, wherein the expression package comprises an installation file comprising a built-in frame number that corresponds to the dynamic expression and used as the designated frame number.

10. A non-transitory, computer-readable medium storing one or more instructions executable by a computer system to perform operations comprising:
   determining that a location of a preview image of a dynamic image is not stored in a memory;
   transmitting in response to determining that the preview image is not stored in the memory, a request for a frame number of at least one static image included in the dynamic image to a network address;
   generating a designated frame number for the at least one static image based on a rule of combining an issued frame number from the network address and a default frame number of a displaying application;
   extracting the at least one static image having the designated frame number;
   displaying the at least one static image having the designated frame number as the preview image to a user;
   receiving a selection, by a user, of the at least one static image;
   requesting and receiving an expression package that comprises frames of the dynamic image; and
   providing the dynamic image, for display to the user, the dynamic image comprising executing the expression package, comprising beginning the dynamic image at a selected image having the designated frame number.

11. The computer-readable medium of claim 10, wherein determining the location of the preview image of the dynamic image is not stored in the memory further comprises obtaining the network address of the expression package that comprises the dynamic image.

12. The computer-readable medium of claim 10, wherein the designated frame number comprises an issued frame number of the dynamic image, a locally stored built-in frame number of the dynamic image, or a default frame number.

13. The computer-readable medium of claim 10, further comprising determining whether the issued frame number is received from the network address within a predetermined time.

14. The computer-readable medium of claim 13, further comprising, in response to determining that the issued frame number is received from the network address within the predetermined time, determining that the issued frame number is greater than a maximum frame number of the dynamic image.

15. The computer-readable medium of claim 14, further comprising, in response to determining that the issued frame number is not received from the network address within the predetermined time, setting a last frame of static image data of the dynamic image as the designated frame number for the preview image.

16. The computer-readable medium of claim 10, wherein extracting the at least one static image having the designated frame number further comprises:
   generating a preview image corresponding to the at least one static image; and
   caching the preview image in the memory.

17. The computer-readable medium of claim 10, wherein the dynamic image comprises a dynamic expression in an expression package.

18. The computer-readable medium of claim 17, where the expression package comprises an installation file comprising a built-in frame number that corresponds to the dynamic expression and used as the designated frame number.

19. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      determining that a location of a preview image of a dynamic image is not stored in a memory;
      transmitting in response to determining that the preview image is not stored in the memory, a request for a frame number of at least one static image included in the dynamic image to a network address;
      generating a designated frame number for the at least one static image based on a rule of combining an issued frame number from the network address and a default frame number of a displaying application;
      extracting the at least one static image having the designated frame number;
      displaying the at least one static image having the designated frame number as the preview image to a user;
      receiving a selection, by a user, of the at least one static image;
      requesting and receiving an expression package that comprises frames of the dynamic image; and
      providing the dynamic image, for display to the user, the dynamic image comprising executing the expression package, comprising beginning the dynamic image at a selected image having the frame number.

20. The computer-implemented system of claim 19, wherein determining the location of the preview image of the dynamic image is not stored in the memory further comprises obtaining the network address of the expression package that comprises the dynamic image.

* * * * *